United States Patent [19]
Yamamoto et al.

[11] Patent Number: 5,501,874
[45] Date of Patent: Mar. 26, 1996

[54] METHOD OF COATING GRANULAR MATERIAL AND APPARATUS THEREFOR

[75] Inventors: Takaharu Yamamoto, Kitakyushu; Teruji Tahara, Odawara; Kouji Eguchi, Kitakyushu, all of Japan

[73] Assignee: Mitsubishi Chemical Corporation, Tokyo, Japan

[21] Appl. No.: 243,600

[22] Filed: May 13, 1994

[30] Foreign Application Priority Data

| May 18, 1993 | [JP] | Japan | 5-139376 |
| Jun. 29, 1993 | [JP] | Japan | 5-185612 |
| Dec. 14, 1993 | [JP] | Japan | 5-342527 |

[51] Int. Cl.$^6$ ............................................. B05D 7/00
[52] U.S. Cl. .................... 427/212; 427/215; 427/220; 427/221; 427/372.2; 427/421; 118/58; 118/64; 118/303
[58] Field of Search ............... 427/372.2, 220, 427/221, 215, 213, 242; 118/64, 58, 303

[56] References Cited

U.S. PATENT DOCUMENTS

| 4,639,383 | 1/1987 | Casey | 118/58 |
| 4,686,115 | 8/1987 | Majer | 118/303 |

FOREIGN PATENT DOCUMENTS

| 53-44339 | 11/1978 | Japan . |
| 63-4871 | 1/1988 | Japan . |
| 138102 | 8/1989 | Japan . |
| 244792 | 7/1990 | Japan . |
| 231039 | 7/1990 | Japan . |
| 2-31039 | 7/1990 | Japan . |
| 5212262 | 8/1993 | Japan . |

*Primary Examiner*—Shrive Beck
*Assistant Examiner*—David M. Maiorana
*Attorney, Agent, or Firm*—McAulay Fisher Nissen Goldberg & Kiel

[57] ABSTRACT

Disclosed are a method of coating a granular material comprising steps of: dropping a granular material from an upper portion in a draft disposed in a coating apparatus; spraying the granular material during falling with a coating solution containing a film-forming material dissolved in a solvent in the draft; drying the granular material sprayed with the coating solution by a drying gas flowing upwardly from a lower portion to an upper portion in the draft; and carrying the dropped granular material to an upper portion in the coating apparatus, and a coating apparatus for coating a surface of a granular material with a coating solution while dropping the granular material, comprising a guide for guiding the granular material, coating solution spray nozzles disposed inside a draft and a means for supplying a drying gas upwardly from a lower portion to an upper portion to the granular material falling in the draft.

19 Claims, 8 Drawing Sheets

METHOD OF COATING GRANULAR MATERIAL AND APPARATUS THEREFOR

BACKGROUND OF THE INVENTION

The present invention relates to a method of coating a granular material and an apparatus therefor. More in particular, it relates to a method of coating a granular material, which is an improved method such that a coating film of a film-forming material can be formed at a uniform thickness on the surface of the granular material, and an apparatus therefor.

In recent years, it has been desired, for example, in granular fertilizers or agricultural chemicals, to control the dissolving rate of effective ingredients contained therein more strictly in a long period of time such as from several weeks to several months. This is so intended to obtain required effects of the fertilizers or agricultural chemicals effectively for a long period of time by a few number of application or scattering, for example, once or twice throughout the course of seeding, growth and harvest of plants.

For this purpose, it has been proposed to coat the surface of a granular material such as fertilizer or agricultural chemical with a polymer.

The coating method proposed so far includes, for example, (1) a method comprising blowing a granular material upwardly by a gas stream jetted out upwardly and applying a coating material on the surface of the granular material (Japanese Patent Publication (KOKOKU) Nos. 1-38102 (1989), 2-31039 (1990) and 2-44792 (1990) (2) ; a method comprising charging a granular material in a rotating drum and spraying a coating solution composed of a organic solvent solution of a thermoplastic resin while rolling the material in the drum, thereby applying the coating material on the surface thereof (Japanese Patent Publication (KOKOKU) No. 53-44339 (1988)(3)); and a method comprising repeating steps of carrying a granular material on a rotating drum having lifts disposed on an inner wall, dropping the granular material from an upper portion in a calm region, spraying a coating solution thereby applying a coating material on the surface of the granular material in the calm region, drying in a blowing region, and dropping and then landing the material (Japanese Patent Application Laid-Open (KOKAI) No. 63-4871 (1988)).

However, in any of the methods described above, a dissolving characteristic thereof varies greatly when measured for a long period of time, and this is considered to be attributable to the reasons described below. In the method (1), since excessive stresses are applied, a film thickness varies and flaws are caused to the coating film. In the method (2), since the coating solution is sprayed on the granular material under rolling in the drum, the granular material is sometimes agglomerated to each other into lumps before drying, whereby the treated granular material tends to cause unevenness in the resultant coating film and leaves flaws due to adhesion and peeling between each of the particles. The method (3) seems to be considered most preferable, but it has been found also impossible to strictly control the dissolving rate for a long period of time by the investigation made by the present inventors. The present inventors have observed the granular material obtained in this method by a microscope of high magnification and found that small flaws are present at the coating film surface or traces of adhesion and peeling are observed in various portions of the granular materiel. According to the studies of the present inventors, it has been found that the small flaws are liable to cause when the granular material falls from a considerable height and small traces of adhesion and peeling are caused between particles of the granular material due to insufficient drying unless there is a sufficient drying time (sufficient height) during falling after spraying and depositing the coating solution on the surface thereof. Accordingly, it has been found for the method (3), that high or low falling distance results in the problem.

Further, in the methods (2) and (3), sprayed coating solution promotes coagulation between particles of the granular material to increase agglomeration depending on the amount of the granular material contained in the drum and the amount of the coating solution sprayed relative to the amount of the granular material, making it further difficult to form the uniform coating film and failing to obtain an industrially usable processing efficiency.

As a result of an earnest study made for dissolving the drawbacks in the prior arts, it has been found that in a method of coating a granular material comprising steps of dropping the granular material to be coated from an upper portion, spraying a coating solution containing a film-forming material dissolved in a solvent to the granular material in the course of falling, drying the sprayed granular material and carrying the dropped granular material upwardly, by dropping the granular material in a draft and drying the granular material sprayed with the coating solution by a drying gas flowing upwardly from a lower portion to an upper portion in the draft, a coating film can be formed uniformly and with no flaws on the surface of a granular material and contents can be dissolved uniformly. On the basis of this finding, the present invention has been attained.

SUMMARY OF THE INVENTION

An object of the present invention is to provide a novel method of coating a granular material capable of applying a coating treatment on the surface of the granular material to form a coating film uniformly and with no flaws.

Another object of the present invention is to provide a novel apparatus for coating a granular material for applying a coating treatment on the surface of a granular material to form a coating film uniformly and with no flaws.

To accomplish the aims, in a first aspect of the present invention, there is provided a method of coating a granular material comprising steps of:

dropping a granular material from an upper portion in a draft disposed in a coating apparatus;

spraying the granular material during falling with a coating solution containing a film-forming material dissolved in a solvent in the draft;

drying the granular material sprayed with the coating solution by a drying gas flowing upwardly from a lower portion to an upper portion in the draft; and carrying the dropped granular material to an upper portion in the coating apparatus.

In a second aspect of the present invention, there is provided a coating apparatus for coating a surface of a granular material with a coating solution while dropping the granular material, comprising a guide for guiding the granular material, coating solution spray nozzles disposed inside a draft and a means for supplying a drying gas upwardly from a lower portion to an upper portion to the granular material falling in the draft.

DETAILED DESCRIPTION OF THE INVENTION

Figure 1:
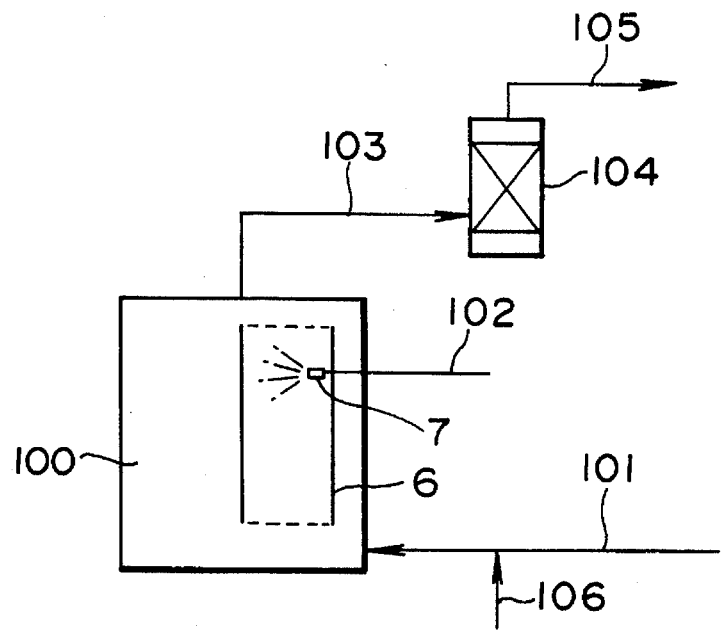
FIGS. 1 and 2 are explanatory views for a method of coating a granular material according to the present invention.

Granular materials to be treated for the coating method according to the present invention include various kinds of granular materials having an average particle size usually of about 1 to 10 mm, preferably about 2 to 4 mm and a specific gravity usually of about 0.7 to 1.8, preferably about 0.9 to 1.5. Typically, as the granular materials, granular fertilizer, granular agricultural chemical or the like can be exemplified. There is no particular restriction on the film-forming material so long as the material is capable of forming a coating film on the surface of the granular material, and a polymeric material can be mentioned as an example. The film-forming material can be selected depending on the purpose of coating and, for example, various kinds of known film-forming polymers such as ethylene homopolymer, ethylene copolymer, acrylic resins and acrylamide resins can be used, if the granular material is fertilizer or agricultural chemicals.

As the solvent, water and organic solvent can be exemplified and usually the organic solvent is used when the film-forming material is a polymeric material. As the organic solvent for dissolving the polymeric material, a solvent capable of dissolving the polymeric material and having a low boiling point is usually selected, and an organic solvent, for example, halogenated hydrocarbon such as perchloroethylene, dichlorobenzene and trichloroethylene and aromatic hydrocarbon such as benzene, toluene and xylene can be used. As the drying gas, an inert gas such as air or nitrogen gas is usually used.

The coating solution is usually prepared by dissolving the film-forming material in the solvent, and the concentration of the film-forming material in the coating solution is within a range of usually 1 to 7% by weight, preferably 3 to 5% by weight. Further, surface active agents, inorganic particles and other additives may be incorporated, if necessary, to the coating solution.

The coating method according to the present invention is conducted, for example, in the process shown in FIG. 1 or FIG. 2 as described below. At first, a drying gas is supplied from a drying gas-feeding pipe 101 into a coating apparatus 100, a granular material falling from an upper portion is introduced into a draft 6 in the coating apparatus 100 and falls in the draft 6, and the drying gas flows upwardly from lower to upper portion in the draft 6. Then a coating solution is supplied from a coating solution-feeding pipe 102 in the draft 6 while flowing the drying gas upwardly from lower to upper portions and then the coating solution is sprayed and deposited onto the granular material by a spray nozzle 7. Then, the solvent is distilled away and removed from the coatings deposited on the surface of the granular material to form a coating film of the membrane-forming material such as a polymeric material on the surface of the granular material. As a means for carrying the granular material upwardly, a lift or a pneumatic transportation is usually employed. Particularly, a means comprising a lift disposed in a rotating drum is preferred for preventing excessive stresses from exerting on the coated granular material because it is simple and efficient.

The flow rate of the drying gas is selected from a proper range corresponding to the processing amount of the granular material and it is usually 4 to 25 $Nm^3/kg$, preferably 6 to 20 $Nm^3/kg$ based on the weight of the coating solution. The linear velocity of the drying gas is selected from a range of usually 2 to 10 m/sec, preferably 3 to 7 m/sec. The temperature of the drying gas is usually 20 to 100° C., preferably 60° to 90° C. The spraying amount of the coating solution is properly selected while considering the kind of the granular material and the coating thickness, and it is determined within a range of usually 150 to 250% by based on the granular material. The coating thickness of the polymeric material is usually 50 to 200 μm, preferably 60 to 120 μm.

The coating method and the coating apparatus according to the present invention will now be explained by way of its preferred embodiment shown in FIG. 3.

Figure 3:
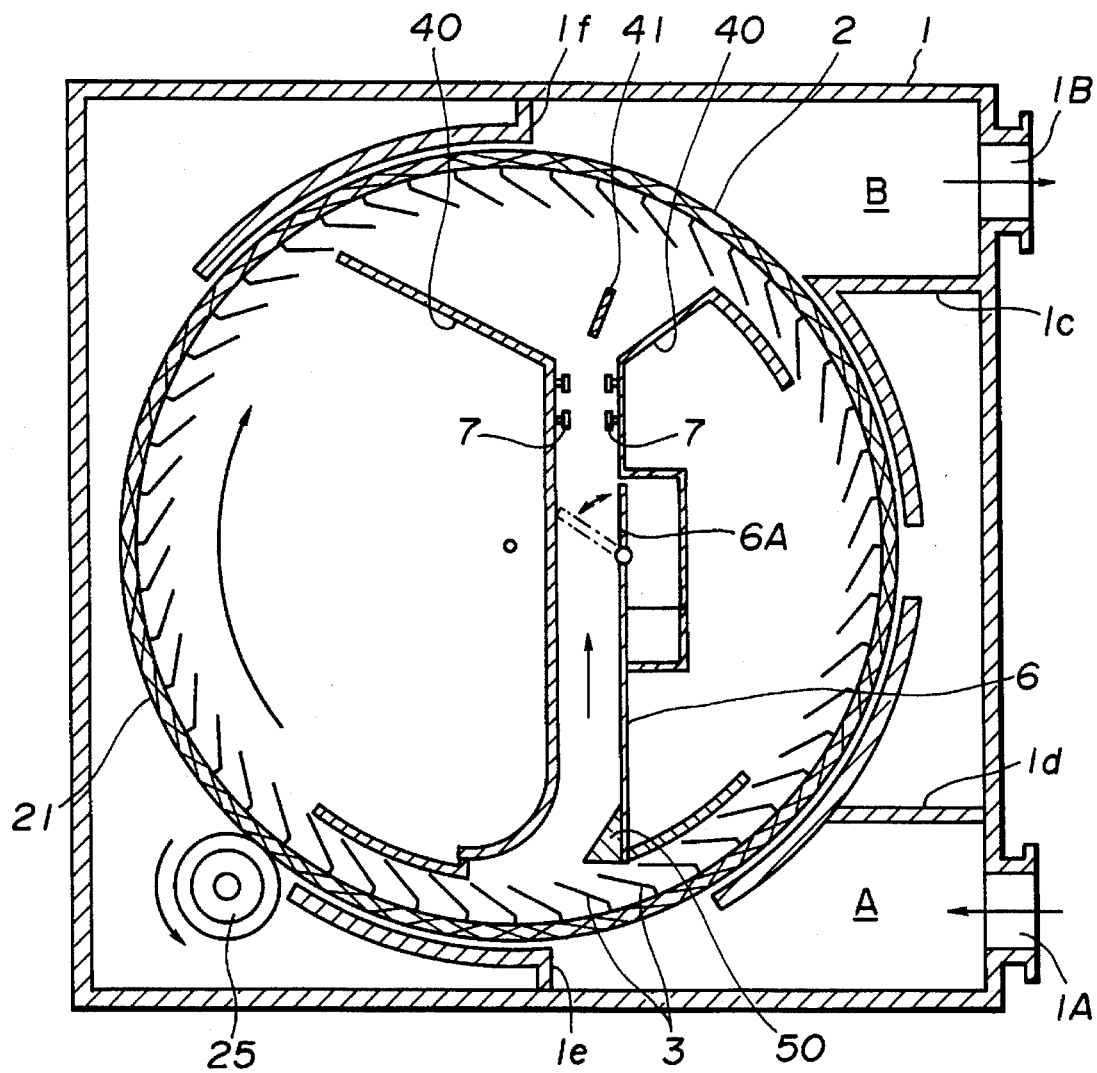
FIG. 3 is a side elevation cross sectional view showing a constitution for a coating apparatus suitably used in the method according to the present invention.

A coating apparatus shown in FIG. 3 is an apparatus for applying a coating solution on the surface of a granular material during falling of the material and the apparatus comprises a casing 1 having an inlet 1A and an outlet 1B for the drying gas disposed respectively near the bottom and the top thereof, a rotating drum 2 which is disposed in the casing with the axis being substantially horizontal and has a circumferential surface made of a gas permeable material, lifts 3 protruded from the inner circumferential surface of the drum and scooping up the granular material along with the rotation of the drum, a draft 6 stood vertically along a falling path of the scooped up granular material and spray nozzles 7 for the coating solution disposed to the inner wall of the draft 6 directing to the falling path of the granular material.

The casing 1 is made gastight and contains the cylindrical drum 2 and, in a case where the drum 2 is long axially, the casing 1 is made, for example, a substantially in a box-like shape and disposed with its longitudinal direction being horizontal. The inlet 1A and the outlet 1B are disposed such that the supplied drying gas is allowed to pass substantially linearly from lower to upper portions upwardly in the drum 2 and they are disposed, for instance, at lower and upper positions on one side of the casing 1, respectively. In order to ensure that the supplied gas is introduced in and passed through the draft 6 disposed in the drum 2, partition walls 1d, 1e, 1c and 1f are protruded near the inlet 1A and the outlet 1B from the inner wall of the casing 1 to the positions adjacent to the outer circumferential surface of the drum 2, to constitute an inlet channel A and an outlet channel B.

The drum 2 usually has a diameter of about 0.5 to 5 m and an axial length of about 0.5 to 10 m, but the volume can be set optionally depending on the processing amount.

Further, a roller 25 contacts with the circumferential wall 21 forming the circumferential surface of the drum 2. The roller 25 is driven by a geared motor and the drum 2 is rotated at a circumferential speed of about 0.1 to 0.7 m/sec per meter of the diameter of the drum 2. The circumferential wall 21 is made of a gas permeable material such as metal mesh which does not allow the granular material contained in the inside to pass out but allows the drying gas to pass sufficiently.

The lifts 3 are a means for carrying the granular material to the upper portion of the drum 2, each of which is constituted with a long strip-like member disposed in parallel with the axis of the drum 2, extended substantially over the entire axial length of the drum and fixed to the circumferential wall 21 of the drum 2. The lift 3 has a J-shaped cross section in which the top end is bent toward the rotating direction and surely scoop up the granular material to the upper portion of the drum 2. Usually, about 6 to 100, preferably 20 to 60 of lifts are disposed in the circumferential direction of the circumferential wall 21 of the drum 2.

The granular material carried by the lifts starts to fall spontaneously when the drum 2 rotates to a position determined depending on the shape of the lifts. The falling granular material entirely enters by a guide 40 which is a means for introducing the material into the draft 6. The guide 40 may have any shape so long as it can introduce the falling granular material into the draft 6 and it is preferred to make the guide in a shape with an effect of supplying the granular material at a more uniform distribution in the draft 6. For this purpose, a rectification plate 41 is also preferably disposed above an upper opening of the draft 6 for distributing the granular material discharged from the lift 3 more uniformly.

As the spray nozzle 7, various kinds of known spray nozzles can be used, which are properly selected depending on the viscosity of the coating solution and the processing amount. The coating solution is fed to the spray nozzles 7 by a coating solution feeding means disposed separately (not shown in the drawing). The amount of the coating solution to be fed is properly determined based on the kind of the granular material and the film thickness, and it is usually 150 to 250% by weight based on the processing amount of the granular material.

The spray nozzles 7 are disposed, as shown in FIG. 3, to an upper region of the inner wall of the draft 6 disposed vertically along the falling path of the granular material. The draft 6 is disposed for applying an efficient coating treatment while preventing wasteful scattering of the granular material which is scooped up by the lift 3 and then dropped. The draft 6 is formed as a tubular shape having a rectangular cross section and has an opening over the entire axial length of the drum 2. The plural spray nozzles 7 are disposed at appropriate intervals on the inner wall of the draft 6 along the axial direction of the drum 2 and they are usually arranged in one or plurality of rows on the inner walls opposed in parallel with the axis of the drum.

A coating solution is sprayed from the spray nozzles disposed on the inner walls of the draft 6, and applied to the granular material carried by the lifts 3 upwardly and dropped through the draft 6 as described above.

It is considered that the thus coated granular material is free from small traces of peeling or small flaws on the coating surface because the coating solution is dried in falling and the particles do not adhere to each other, as well as impact upon landing is reduced due to the lowering of the falling speed of the granular material, because of contact with the drying gas flowing in the direction opposite to the falling direction of the granular material to be treated in the draft 6. For further improving such effects, the particle size and the specific gravity of the granular material, the flow rate of the drying gas (preferably, flowing conditions of the drying gas through the draft 6 are adjusted so as to form a constant laminar flow for attaining the effect) and the falling speed of the granular material are properly determined.

Referring to the falling speed of the granular material, the maximum falling speed is preferably less than 6 m/sec and, more preferably 1.5 to 4 m/sec.

For further improving the effect, it is preferred, for example, to provide a reflection plate 50 to a lower portion of the draft 6 thereby colliding the falling granular material against the reflection plate 50 to change the direction thereof and to rotate the drum 2 in the direction of such change (direction shown by an arrow in the drawing).

In a case of using the apparatus shown in FIG. 3, the granular material is charged from the lateral side of the drum 2 (not shown in the drawing) and is easily discharged by turning down a movable partition plate (door) 6A.

Figure 5:
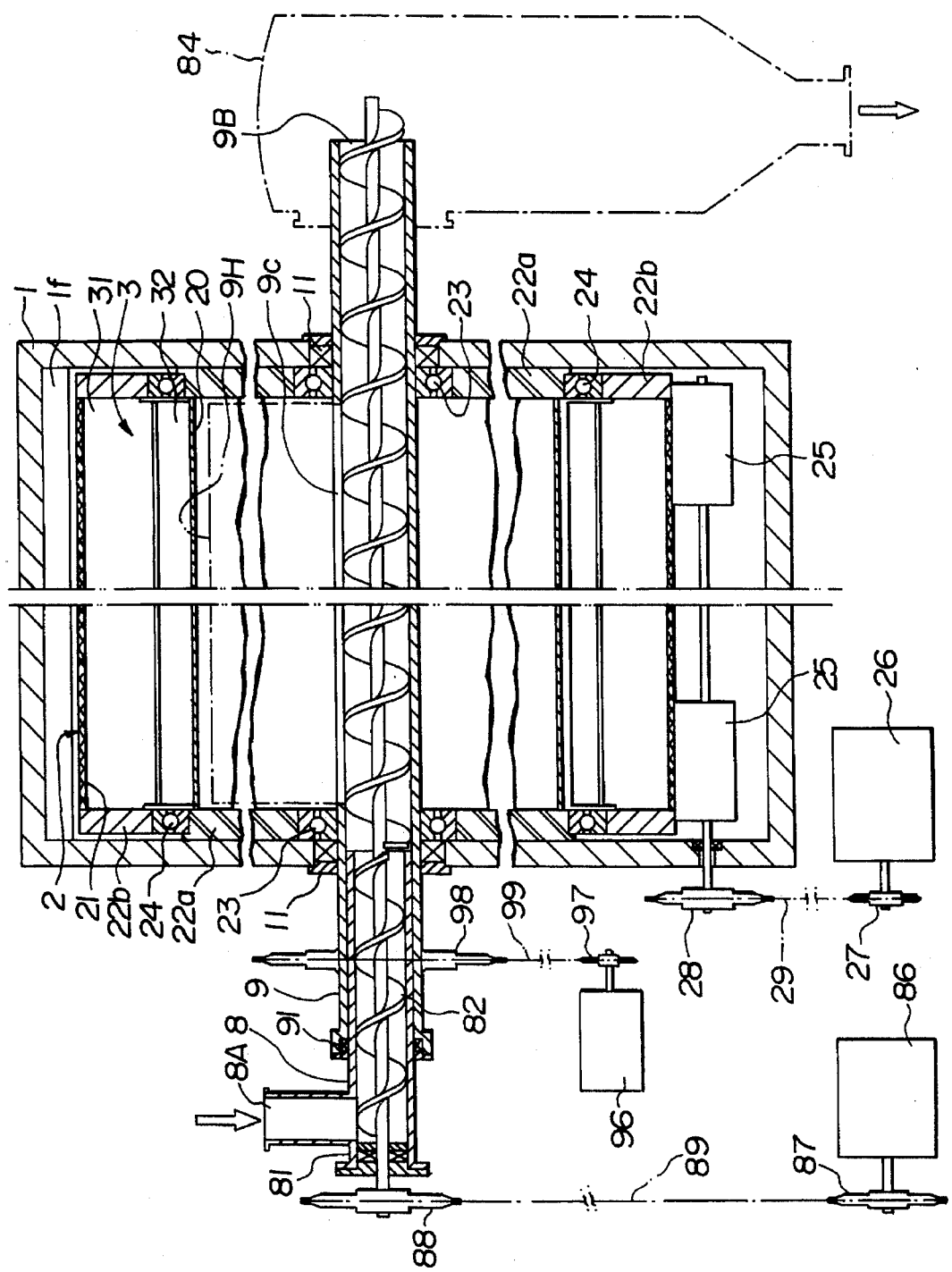
FIG. 5 is a cross sectional view taken along lines V—V in FIG. 4.

In the apparatus shown in FIG. 3, charging and discharging of the granular material can be made through one end face of the drum which is disposed independently of the circumferential surface of the drum 2 and is not rotatable. For example, an inlet of the granular material is formed on the end face of the drum 2 and a transfer pipe (discharging means) for discharging of the granular material passes through the end face. The transfer pipe is disposed approximately parallel with the axis of the drum 2 through the end face. A screw conveyer as shown in FIG. 5 referred to below can be provided in the transfer pipe. A portion of the wall of the draft is a door 6A which is swingable. The door 6A opens inside the draft 6 and discharges the granular material which falls in the draft 6 from the draft 6 to feed the granular material to the transfer pipe.

The coating method and the coating apparatus according to the present invention is also described with reference to other embodiments.

Figure 4:
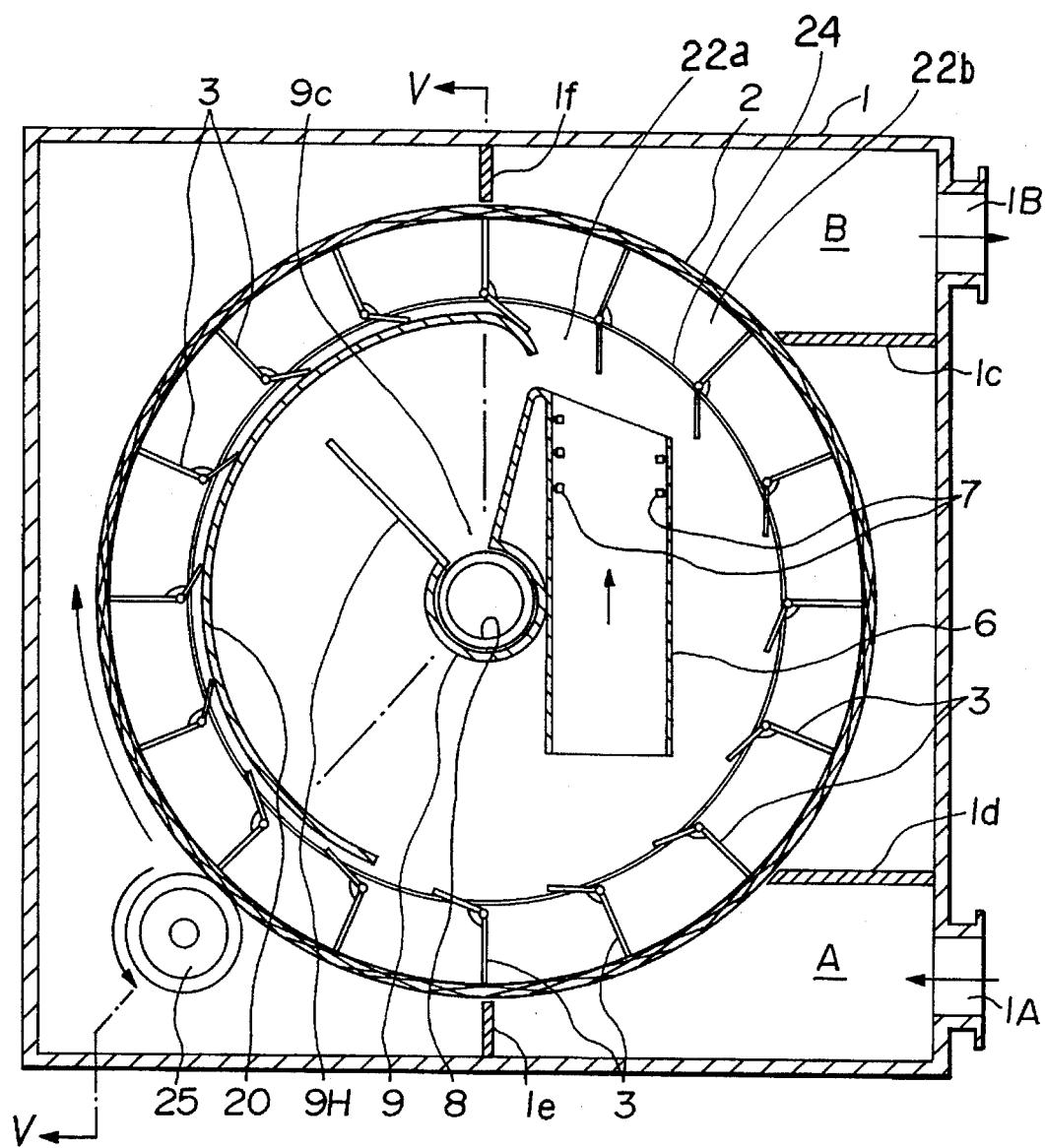
FIG. 4 is a side elevation cross sectional view showing another constitution for a coating apparatus suitably used in the method according to the present invention.

FIG. 4 shows a modification of the embodiment shown in FIG. 3, in which common portions with those in FIG. 3 have the same means. In FIG. 4, both end faces of the drum 2 comprise a doughnut plate 22a of a small diameter disposed on the side of the axial center and a doughnut plate 22b of a large diameter disposed on the side of a circumferential surface. The doughnut plates 22a and 22b are coupled by way of bearings 24, and the doughnut plate 22a of the small diameter is fixed to the casing 1. In the casing 1, the drum 2 is supported by the doughnut plate 22a to the casing 1, and the circumferential wall 21 is made rotatable together with the doughnut plate 22b at the outer circumference. The portion corresponding to the doughnut plate 22a may be formed integrally with the casing 1 and a bush made of a resin material or the like may be used to a portion corresponding to the bearings 24 for improving the gastightness.

At the inside of the drum 2, as shown in FIG. 4, a guide plate 20 is disposed along about one-half circumference from about the lowest position to about the highest position of the drum 2 as a preferred embodiment according to the present invention. That is, the guide plate 20 has a shape curved along the circumferential wall 21. The guide plate 20 is disposed for scooping up the granular material contained in the drum 2 more efficiently by using the lifts 3 and it is attached to the doughnut plate 22a forming the end face of the drum 2 secured to the inner wall of the casing 1, thereby being fixed at a predetermined position. The guide plate 20 is positioned at a somewhat inner circumferential side of the drum 2 than the edge of the lifts 3 relative to the circumferential wall 21.

The upper end of the guide plate 20 curves downwardly to form the guide for smoothly dropping the granular material into the draft 6.

Figure 6:
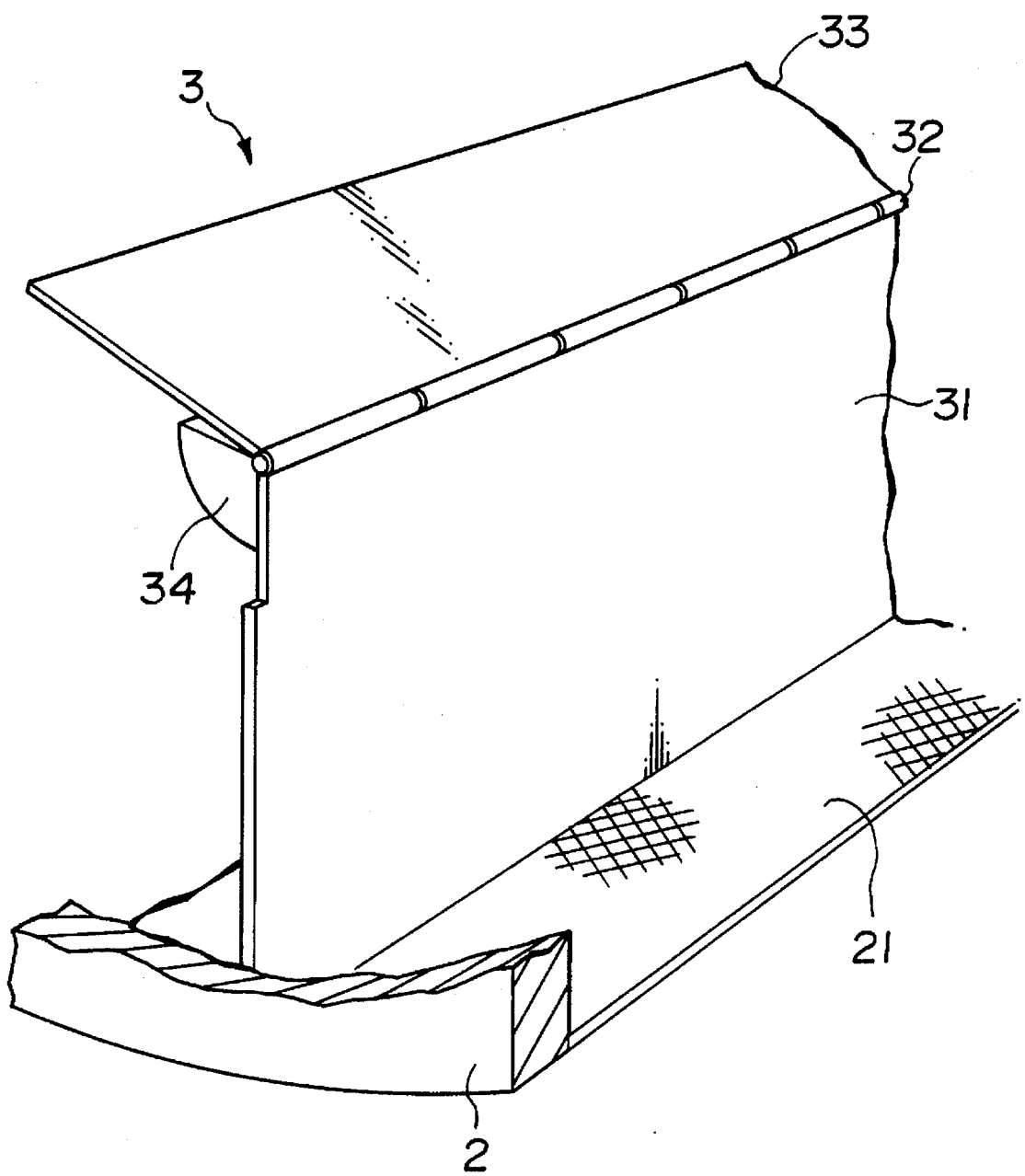
FIG. 6 is a perspective view for a constitution of a lift disposed to the inner circumferential surface of a drum in the coating apparatus shown in FIG. 4.

Further, in a preferred embodiment according to the present invention, as shown in FIG. 6, the lift 3 comprises a flat plate 31 secured to the circumferential wall 21 for substantially retaining the granular material, and a scraper 33 properly abutting against the outer circumferential surface of the guide plate 2 for preventing the retained granular material from overflowing upon scooping up the material. The scraper 33 is swingably attached by means of a hinge 32 to the edge of the fixing plate 31 on the side of the axial line of the drum 2 and adapted to abut against the outer circumferential surface of the guide plate 20.

More specifically, a stopper 34 is attached, in adjacent with the hinge 32, to the plate of the flat plate 31 on the side facing the rotating direction of the drum 2 so as to control the swinging range of the scraper 33 in the rotating direction to a predetermined angle. That is, the control for the range of the swinging movement of the scraper 33 prevents the scraper 33 from stacking by its own weight on the fixing plate 31 during rotation of the drum 2. The swinging range of the scraper 33 is up to about 90°, preferably not more than about 60° relative to the plane of the fixing plate 31 on the side facing the rotating direction.

Further, in a preferred embodiment according to the present invention, as shown in FIG. 5, a transfer pipe 9 for the granular material is provided at the axis of the drum 2 and the transfer pipe 9 is made rotatable by bearings 23 disposed to insertion portions to the doughnut plate 22a at the end face of the drum 2. The insertion portion to the casing 1 is made gastight by shield members 11. The transfer pipe 9 is rotatable by a motor 96 capable of rotating forwardly and backwardly by way of a sprocket fitted to the transfer pipe, a chain 98, and a sprocket 97. Further, as shown in FIG. 5, the transfer pipe 9 has a slit 9c opened in the axial direction and a hopper 9H protruded above the slit for introducing the granular material. The opening of the hopper 9H is formed, together with the slit 9c, substantially over the entire length of the drum 2 for collecting the treated granular material scooped up by the lifts 3 and dropping from upper end of the guide plate 20.

As a preferred embodiment of the transfer pipe, as shown in FIG. 5, the transfer pipe 9 has a screw conveyor 82 which is used as a feeding pipe and a discharge pipe for the granular material. A feeding pipe 8 is internally inserted to one end of the transfer pipe 9 for supplying the granular material and the feeding pipe 8 has a supply port 8A disposed for introducing the granular material into the pipe. The feeding pipe 8 has a discharge port 9B at the other end, which is inserted, for example, into a reservoir 87 for storing the treated granular material.

The screw conveyor 82 is inserted continuously through the transport pipe 9 and the feeding pipe 8 and rotated by a motor 86 by way of a sprocket 88, a chain 89 and a sprocket 87. Gastightness between the transfer pipe 9 and the feeding pipe 8 is kept by a sealing member 91, while gastightness between the upstream end of the feeding pipe 8 and the driving shaft of the screw conveyor 82 is kept by a sealing member 81.

Figure 7:
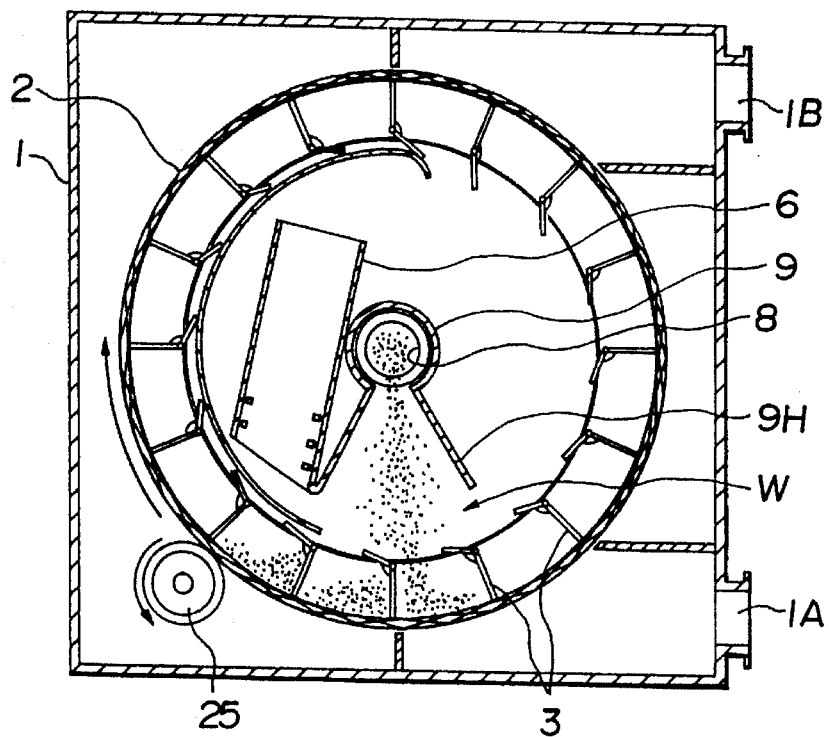
FIGS. 7, 8 and 9 are explanatory views showing an operation method for the coating apparatus shown in FIG. 4.

In the coating apparatus shown in FIG. 4, treatment is conducted batchwise and the material is charged by an amount to be treated in one batch to the drum 2. For charging the starting granular material, the transport pipe 9 is at first rotated to direct the slit 9c (hopper 9H) downwardly in the drum 2. Then, the screw conveyor 82 is started and the granular material as the raw material is charged to the feeding port 8A of the feeding pipe 8. The charged granular material is transported by the screw conveyor 82 in the feeding pipe 8 and the transport pipe 9 successively and then dropped through the slit 9c into the drum 2 as shown by the reference W in FIG. 7.

Coating is conducted as described below.

After feeding the granular material W to the drum 2, the transport pipe 9 is rotated again to move the opening of the draft 6 below the upper end of the guide plate 20 (refer to FIG. 4). Then, the driving motor 26 is started to rotate the drum 2. Meanwhile, after charging the granular material W, a drying gas is fed to the inlet 1A of the casing 1 and a coating solution is supplied to the spray nozzles 7 and sprayed into the draft 6. The drum 2 may be started also upon charging of the granular material W.

Along with the rotation of the drum 2, the lifts 3 protruded from the circumferential wall 21 properly scoop up the granular material W stagnating in the lower portion of the drum 2 and successively transport the same upwardly. Upon scooping up the granular material W, the swinging range of the swingable scraper 33 of the lift 3 in the rotating direction of the drum 2 is controlled and the scraper turns down by its own weight toward the axis of the drum 2 along with the movement from the lowermost position to an upper portion of the drum 2 and abuts against the outer circumference of the guide plate 20 that is disposed over substantially one-half circumference of the drum 2. Accordingly, even when the flat plate 31 that retains the granular material W moves from a substantially horizontally position further upwardly, the granular material W can be prevented from overflowing from the lift 3 by the scraper 33 and the guide plate 20, so that they can be scooped up efficiently.

Figure 8:
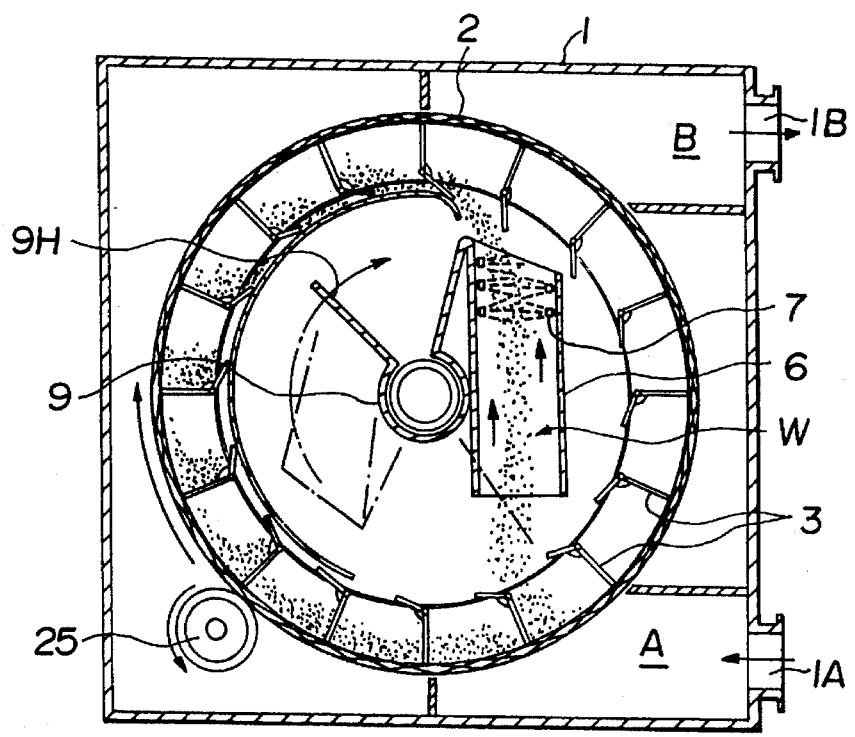

As shown in FIG. 8, the granular material W scooped up along the guide plate 20 falls from the upper end of the guide plate 20 into the draft 6 disposed along the falling path. The spray nozzles 7 disposed in the draft 6 spray the coating solution to the granular material W passing through the inside of the draft 6. In this case, since the draft 6 prevents scattering of the falling granular material W, this enables efficient and uniform spraying to individual granular material W.

On the other hand, a drying gas fed from the inlet 1A of the casing 1 passes from the inlet A along the circumferential wall 21 of the drum 2 and then reaches the outlet B by way of the draft 6. Since the drying gas passing through the draft 6 flows reversely to the falling direction of the granular material, in other words, the drying gas flows upwardly, a contact efficiency with the granular material W is improved. As a result, the granular material deposited with the coating solution is dried rapidly during falling. Further, when the drying gas is heated, the coating solution coated on the granular material W can be dried more rapidly. Although not shown in the drawing, an exhaust gas containing a solvent discharged from the outlet 1B is put to a cleaning process by a customary method.

The granular material W sprayed with the coating solution and dropped on the circumferential wall 21 is again scooped up to the upper portion in the drum 2 and then dropped to the draft 6. During repeating rolling and falling in the drum 2, uniform coating treatment is applied to each of the granular material W. In addition, since the coating solution on the surface of the granular material W scooped up by the lifts 3 is previously dried by the contact with the drying gas during falling, it does not cause agglomeration also upon rolling on the circumferential wall 21 of the drum 2 and, accordingly, uniform coating treatment can be applied efficiently to the surface of the granular material W. The repeating treatment is applied for a predetermined period of time in accordance with or based on the amount of the granular material W to be treated and the thickness of the membrane to be formed.

Figure 9:
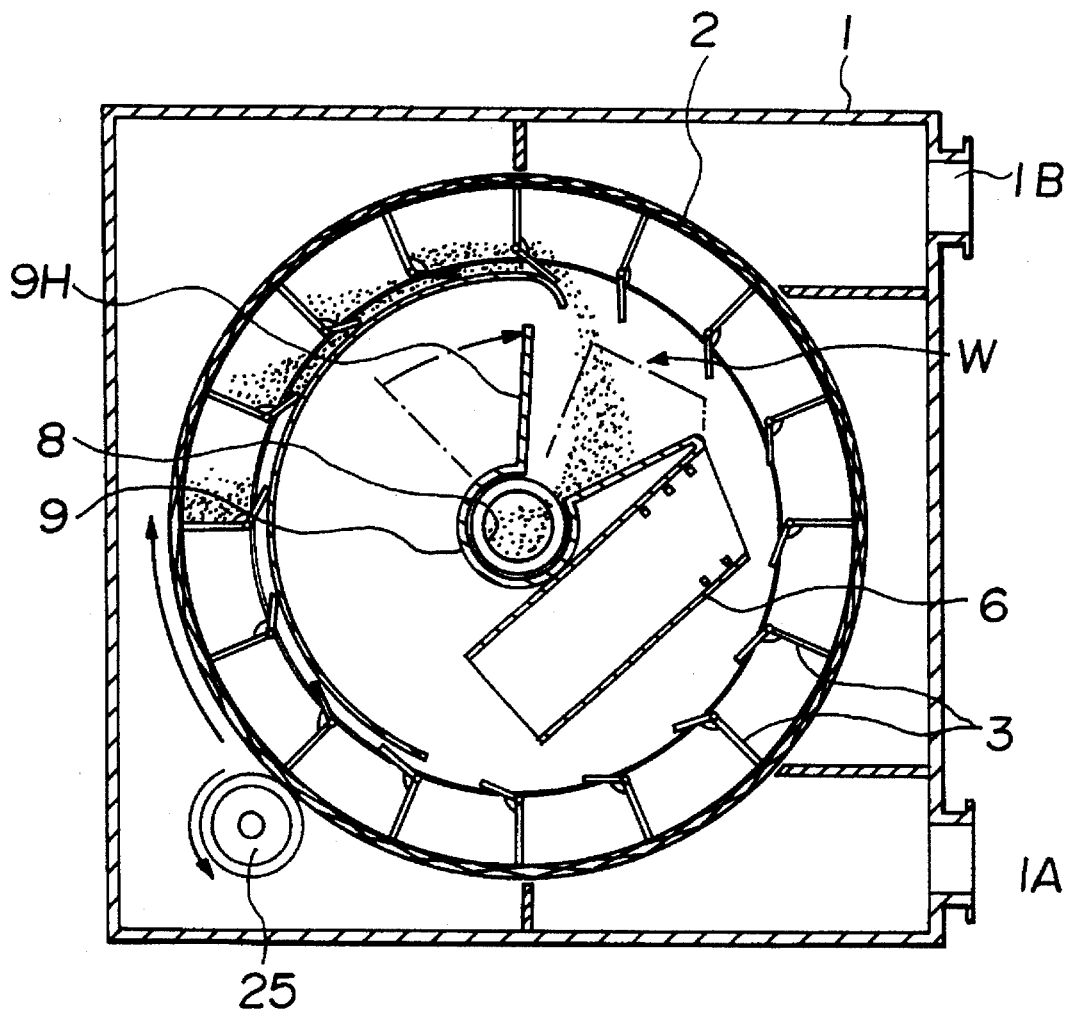

After the coating treatment, spray of the coating solution and the feeding of the drying gas are interrupted and, as shown in FIG. 9, the transport pipe 9 is rotated again to move the hopper 9H (slit 9c) below the upper end of the guide plate 20. The rotating drum 2 and the lifts 3 scoop up and drop the treated granular material W into the hopper 9H substantially in a vertical state. The granular material W is fed from the hopper 9H to the screw conveyor 82. The screw conveyor 82 transports the material through the transport pipe 9 and then discharge the same from the outlet 9B to the reservoir 84 as a final product.

Other embodiments regarding supply and discharge of the granular material in the coating apparatus according to the present invention are described.

Figure 10:
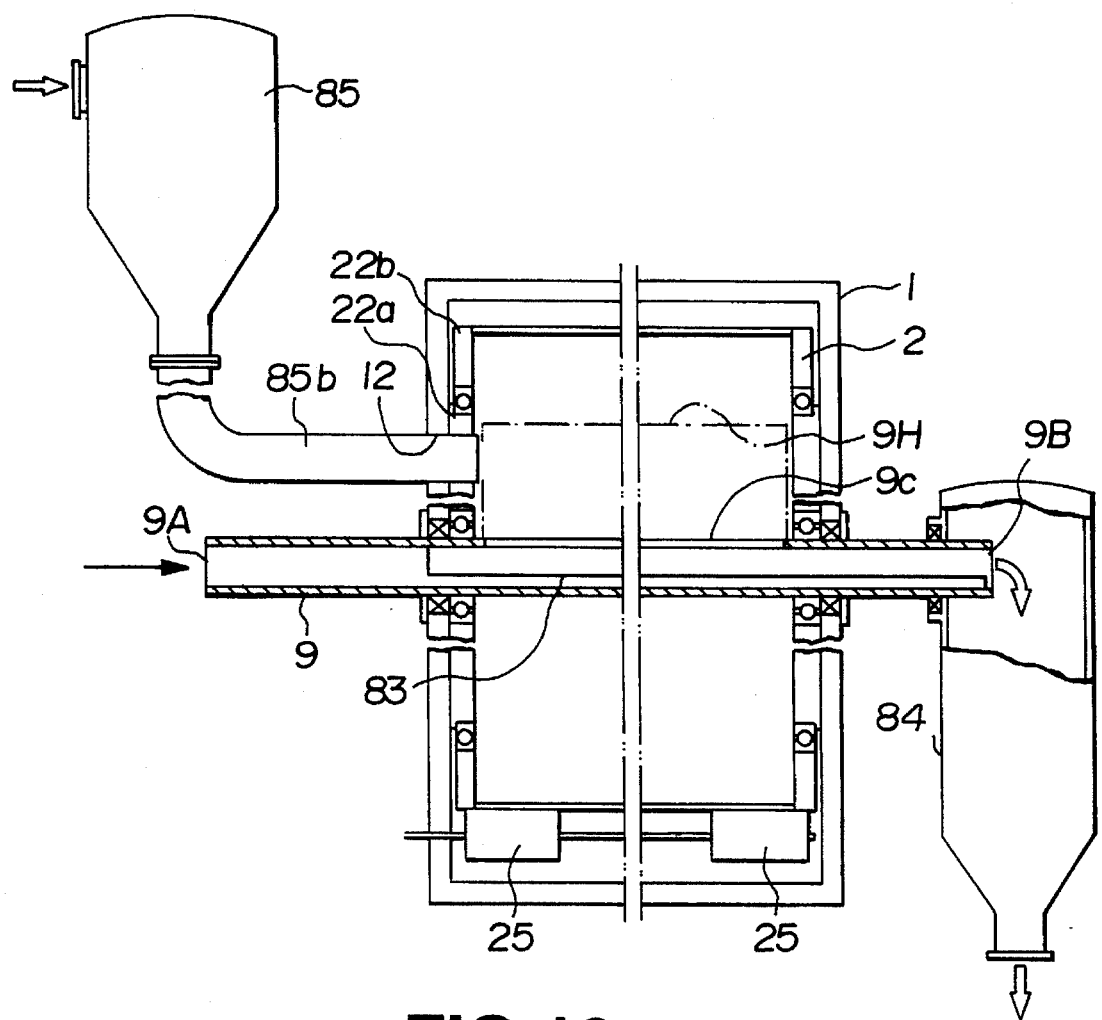
FIG. 10 is a side elevation cross sectional view showing another constitution of a transfer pipe in the coating apparatus shown in FIG. 4.

In another embodiment in the coating apparatus according to the present invention comprises, as shown in FIG. 10, a transport pipe 9 has a pneumatic transport means which is used as a discharge pipe for the granular material. In this embodiment, the transport pipe 9 is partitioned into upper and lower portions by a perforated plate 83, in which an end 9A opposite to an outlet 9B is connected with a gas feeding means for feeding a pressurized inert gas such as air or nitrogen gas (not shown in the drawing).

Figure 11:
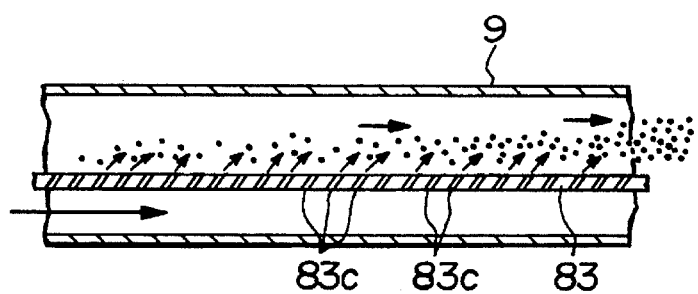
FIG. 11 is a fragmentary cross sectional view showing a pneumatic transfer means of the transfer pipe shown in FIG. 10.

As shown in FIG. 11, the perforated plate 83 has a plurality of apertures 83c each having a diameter smaller than the particle size of the granular material and not allowing the granular material to pass therethrough. The apertures 83c are usually inclined toward the discharge port 9B of the transport pipe 8. The means for charging the granular material to the drum 2, for example, uses a feeding pipe 85b connected at one upstream end to a feeding hopper 85 and inserted at a downstream end into the doughnut plate 22a on the end face of the drum 2 and the casing 1.

The starting granular material is charged from a feeding hopper 85 through a feeding pipe 85b into the drum 2, while treated granular material product is dropped through the hopper 9H (slit 9c) to the upper surface of the perforated plate 83 of the transport pipe 9. In the transport pipe 9, the granular material is transported to the outlet 9B by floating the granular material above the perforated plate 83 by pressurized air fed from the end 9A. In such a pneumatic transport means, since contact between the granular material and the component members is reduced and contact between each of the particles is moderated by the gas in the transport pipe 9, coating films formed on the granular material product can be protected against injury.

Means for feeding the drying gas upwardly in the falling path of the granular material in the embodiment described previously employs a constitution in which the inlet 1A and the outlet 1B for the drying gas are disposed in the vicinity of the bottom and in the vicinity of the top of the casing 1, respectively. The circumferential surface of the drum 2 is made of a gas permeable member, but it may also be constituted such that the drying gas is introduced and discharged from other portions so long as the granular material W coated with the coating solution can be contact in a counter manner with the drying gas during falling in the draft 6.

The present inventors have further made studies for attaining more uniform coating to the granular material and, as a result, have obtained a finding that coating films of more uniform thickness can be formed over the entire surface of the granular material by incorporating a solvent vapor in the drying gas to increase the concentration.

In the coating method according to the present invention, it is preferably to incorporate an organic solvent vapor at a concentration of 1 to 20% by volume in the drying gas.

As the concentration of the solvent vapor in the drying gas is increased, the evaporation rate of the solvent in the coating solution made into minute droplets by spraying can be lowered. Accordingly, this can eliminate undesirable factors of inhibiting formation of coating films at a uniform thickness over the entire surface of the granular material because the concentration of the coating solution is increased due to evaporation of the solvent in the coating solution made into fine droplets before reaching the granular material and the fluidity of the coating solution is deteriorated by the lowering of the temperature caused by latent heat upon evaporation.

Figure 2:
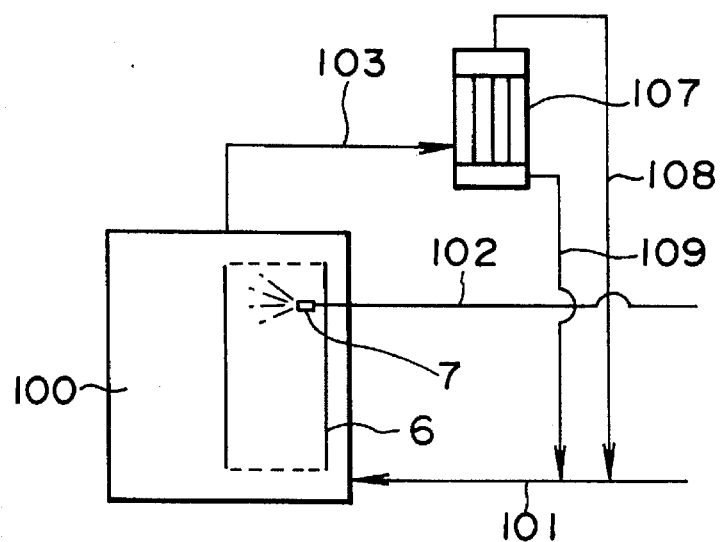

The concentration of the solvent vapor is a concentration at the temperature of the drying gas in the coating apparatus 100 shown in FIG. 1. If the concentration of the solvent vapor is less than 1% by volume, it is difficult to reduce sufficiently the evaporation rate of the solvent in the coating solution made into minute droplets by spraying. On the other hand, if the concentration of the solvent vapor exceeds 20% by volume, the granular material deposited with the coating solution is difficult to be dried sufficiently. The concentration of the solvent vapor is preferably of 1 to 15% by volume, more preferably 1 to 10% by volume, still more preferably 1 to 4% by volume.

In the process shown in FIG. 1, the concentration of the solvent vapor in the drying gas is controlled by adding a predetermined amount of a solvent into the drying gas supplied in the coating apparatus 100. In the process shown in FIG. 1, the solvent is supplied from the solvent feeding pipe 106 through the drying gas feeding pipe 101 into the drying gas. The drying gas discharged from the coating apparatus 100 after the completion of the coating is passed through the exhaust gas pipe 103 and supplied for treatment in the adsorption column 104 charged with an organic material adsorbent such as activated carbon and then discharged as an exhaust gas out of the system from the pipe 105. In a case of adding the solvent into the drying gas, the solvent is usually added in the form of liquid droplets by using a nozzle.

In a process shown in FIG. 2, the concentration of the solvent vapor in the drying gas is controlled by using a heat exchanger 107 as described below. The drying gas discharged from the an exhaust gas pipe 103 is supplied to and cooled by a heat exchanger 107 to condense the solvent vapor contained in the gas. The thus formed solvent is supplied through a recycling pipeline 109 into the drying gas to be supplied to the coating apparatus 100. A tank for the condensed solvent (not shown in the drawing) is disposed, if necessary, between the heat exchanger 107 and the recycling pipe line 109.

The drying gas discharged from the exhaust gas pipe 103 contains a solvent due to drying of the coating solution. Accordingly, the concentration of the solvent vapor in the drying gas can be controlled by such procedures as supplying the solvent condensed and recovered through the recycling pipeline 109 to the drying gas feeding pipe 101, or feeding the exhaust gas discharged from the heat exchanger 107 from the pipe 108 to the drying gas feeding pipe 101. The process shown in FIG. 2 is more advantageous economically than the process shown in FIG. 1 in that the solvent in the drying gas is recovered and recycled.

It is not always necessary that the solvent incorporated into the drying gas is identical with the solvent used for the preparation of the coating solution, but an identical solvent is preferably used. The granular material is circulated and coated to a predetermined film thickness in the coating apparatus 100 and the mean circulation cycle of the granular material is usually about 100 to 600, preferably 150 to 350 cycles.

In the coating method and the coating apparatus according to the present invention, since the granular material coated with the coating solution is brought into contact with the drying gas in a counter manner during falling and the falling speed can be lowered, adhesion of the granular material into agglomeration can be prevented and uniform coating treatment can be applied efficiently to the surface of the granular material.

EXAMPLES

Descriptions will now be made more specifically to the present invention by way of examples but the invention is not restricted only to the examples specified below unless it goes beyond the scope of the invention. Among examples described below, a coating apparatus as shown in FIG. 3 (3.3 m in diameter and 4.0 m in axial length for the drum 2; the lifts 3 were disposed by 48 pieces) was used in Examples 1 to 3. The coating apparatus as shown in FIGS. 4 to 9 (600 mm in diameter and 500 mm in axial length for the drum 2; lists 3 were disposed by 12 pieces) was used in Examples 4 to 7.

Example 1

When a coating treatment was applied to a granular fertilizer to a film thickness of 50 to 100 μm under the conditions shown below, satisfactory coated fertilizer could be obtained.

| | |
|---|---|
| Average particle size of fertilizer | 3.0 mm |
| Amount treated per batch | 400 kg |
| Number of circulation in the treatment | 450 cycles |
| Concentration of coating solution (Polyethylene in perchloroethylene) | 5 wt % |
| Spraying amount of coating solution | 800 kg |
| Flow rate of drying gas (linear velocity in draft 6) | 4.5 m/sec |
| Temperature of drying gas | 80° C. |
| Falling speed of the granular fertilizer at the lower end of the draft | 3.2 m/sec |

Example 2

The fertilizer was coated by using the conditions shown below and controlling the concentration in the gas in the coating apparatus to 6% by volume by adding perchloroethylene to the drying gas. As a result of evaluating the appearance of the resultant coated fertilizer by electron microscopic photography, it was confirmed that the polyethylene film was formed at a uniform thickness on the surface of the granular fertilizer.

| | |
|---|---|
| Average particle size of fertilizer | 3.0 mm |
| Amount treated per batch | 400 kg |
| Number of circulation in the treatment | 450 cycles |
| Concentration of coating solution (Polyethylene in perchloroethylene) | 5 wt % |
| Spraying amount of the coating solution | 800 kg |
| Flow rate of drying gas (linear velocity in draft (6)) | 4.5 m/sec |
| Temperature of drying gas | 80° C. |
| Size of coating solution droplet | 150–200 μm |
| Intended film thickness | 75 μm |
| Falling speed of the granular fertilizer at the lower end of the draft | 3.2 m/sec |

Example 3

When the fertilizer was coated in the same procedures as those in Example 2 except for adding perchloroethylene to the drying gas to control the concentration in the gas to 10% by volume. As a result of evaluating the appearance of the resultant coated fertilizer by electron microscopic photography, it was confirmed that the polyethylene film was formed at a uniform thickness on the surface of the granular fertilizer.

The coated fertilizer obtained in Example 2 showed more excellent uniformness of the coating film. The thickness of the polyethylene coating film could be controlled more uniformly in any of Examples 2 and 3 as compared with Example 1 containing no organic solvent in the drying gas.

Example 4

When a coating treatment was applied to a granular fertilizer to a film thickness of 50 to 100 μm under the conditions shown below, satisfactory coated fertilizer was obtained.

| | |
|---|---|
| Average particle size of fertilizer | 3.0 mm |
| Amount treated per batch | 10 kg |
| Number of circulation in the treatment | 100 to 400 cycles |
| Concentration of coating solution (Polyethylene in perchloroethylene) | 5 wt % |
| Spraying amount of the coating solution | 20 kg |
| Flow rate of drying gas (linear velocity in draft (6) ) | 4.5 m/sec |
| Temperature of drying gas | 80° C. |
| Falling speed of the granular fertilizer when it landed on the drum | 1.8 m/sec |

Example 5

When coating was applied to the fertilizer by using conditions shown below and controlling the concentration in the gas in the coating apparatus to 6% by volume by adding perchloroethylene to the drying gas, satisfactory coated fertilizer was obtained. As a result of evaluation for the appearance of the coated fertilizer by electron microscopic photography, it was confirmed that the coating film of polyethylene was formed at a uniform thickness to the surface of the fertilizer particles.

| | |
|---|---|
| Average particle size of fertilizer | 3.0 mm |
| Amount treated per batch | 10 kg |
| Number of circulation in the treatment | 250 cycles |
| Concentration of coating solution (Polyethylene in perchloroethylene) | 5 wt % |
| Spraying amount of the coating solution | 20 kg |
| Linear flow rate of drying gas (linear flow rate in draft (6)) | 4.5 m/sec |
| Temperature of drying gas | 80° C. |
| Size of coating solution droplet | 150–200 μm |
| Intended film thickness | 75 μm |

| | |
|---|---|
| Falling speed of the granular fertilizer when it landed on the drum | 1.8 m/sec |

Example 6

When the fertilizer was coated in the same procedures as those in Example 5 except for adding perchloroethylene to the drying gas to control the concentration in the gas to 10% by volume, satisfactory coated fertilizer was obtained. As a result of evaluating the appearance of the resultant coated fertilizer by electron microscopic photography, it was confirmed that the polyethylene film was formed at a uniform thickness on the surface of the granular fertilizer.

The coated fertilizer obtained in Example 1 showed more excellent uniformness of the coating film.

Example 7

When the fertilizer was coated in the same procedures as those in Example 5 except for adding no perchloroethylene to the drying gas, satisfactory fertilizer was obtained. As a result of evaluating the appearance of the resultant coated fertilizer by electron microscopic photography, it was confirmed that the polyethylene film formed on the surface of the granular fertilizer was less uniform as compared with the coating film obtained in Examples 5 and 6.

What is claimed is:

1. A method of coating a granular material comprising steps of:
   dropping a granular material from an upper portion in a duct disposed in a coating apparatus;
   spraying the granular material during falling with a coating solution containing a film-forming material dissolved in a solvent in the duct;
   drying the granular material sprayed with the coating solution by a drying gas flowing upwardly from a lower portion to an upper portion in the duct; and
   carrying the dropped granular material to an upper portion in the coating apparatus.

2. A method according to claim 1, wherein the film-forming material is a polymeric material.

3. A method according to claim 1, wherein the solvent is an organic solvent.

4. A method according to claim 1, wherein an average particle size of the granular material is from 1 to 10 mm.

5. A method according to claim 1, wherein a specific gravity of the granular material is from 0.7 to 1.8.

6. A method according to claim 1, wherein a linear velocity of the drying gas in the duct is from 2 to 10 m/sec.

7. A method according to claim 1, wherein a temperature of the drying gas is from 60° to 90° C.

8. A method according to claim 1, wherein the drying gas contains 1 to 20 vol % of a solvent vapor.

9. A method according to claim 1, wherein the drying gas is air or nitrogen gas.

10. A method according to claim 1, wherein a maximum falling speed of the granular material is less than 6 m/sec.

11. A method according to claim 1, wherein the solvent in the coating solution is identical with the solvent in the drying gas.

12. A method according to claim 1, wherein the solvent is a halogenated hydrocarbon or aromatic hydrocarbon.

13. A method according to claim 1, wherein the dropped granular material is carried by a rotating drum having lifts from a lower portion to an upper portion.

14. A method according to claim 13, wherein both the duct and the lifts are disposed to the inside of the rotating drum.

15. A method according to claim 13, wherein a circumferential speed of the rotating drum is from 0.1 to 0.7 m/sec per meter of diameter of the drum.

16. A method according to claim 13, wherein the lifts are disposed by from 6 to 100 pieces in the circumferential direction of the rotating drum each at regular intervals.

17. A coating apparatus for coating a surface of a granular material with a coating solution while dropping the granular material, comprising a guide for guiding the granular material, coating solution spray nozzles disposed inside a duct and a means for supplying a drying gas upwardly from a lower portion to an upper portion to the granular material falling in the duct.

18. An apparatus according to claim 17, comprising a rotatable drum for containing a granular material, lifts protruded from an inner circumferential surface of the drum for carrying the granular material along with the rotation of the drum, a guide disposed along a falling path of the granular material for collecting the granular material, a duct disposed below the guide, spray nozzles for the coating solution disposed inside the duct and a means for supplying the drying gas upwardly from a lower portion to the duct.

19. An apparatus according to claim 17, comprising a rotatable drum disposed in a casing with an axial line being situated substantially horizontally, lifts protruded from an inner circumferential surface of said drum for scooping up the granular material along with the rotation of said drum, a duct disposed vertically along a falling path of the granular material, spray nozzles for coating solution disposed to an inner wall of the duct and directed to the falling path of the granular material, and means for supplying a drying gas upwardly from a lower portion to an upper portion to the falling path of the granular material.

* * * * *